US009616360B2

(12) United States Patent
Ushimaru

(10) Patent No.: US 9,616,360 B2
(45) Date of Patent: Apr. 11, 2017

(54) GAS-LIQUID SEPARATOR AND POLISHING APPARATUS

(71) Applicant: EBARA CORPORATION, Tokyo (JP)

(72) Inventor: Seiya Ushimaru, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 0 days.

(21) Appl. No.: 14/135,364

(22) Filed: Dec. 19, 2013

(65) Prior Publication Data

US 2014/0235147 A1 Aug. 21, 2014

(30) Foreign Application Priority Data

Dec. 21, 2012 (JP) .................................. 2012-279750

(51) Int. Cl.
 *B01D 19/00* (2006.01)
 *B01D 19/02* (2006.01)
 *B24B 37/04* (2012.01)
(52) U.S. Cl.
 CPC ............. *B01D 19/02* (2013.01); *B01D 19/00* (2013.01); *B01D 19/0047* (2013.01)
(58) Field of Classification Search
 CPC ........ B24B 37/04; B01D 19/00; B01D 19/02; B01D 19/0047
 USPC .................................. 451/41, 285, 287, 466
 See application file for complete search history.

(56) References Cited

U.S. PATENT DOCUMENTS 3,996,027 A * 12/1976 Schnell et al. .................. 95/261
5,679,063 A   10/1997 Kimura et al.
5,944,894 A *  8/1999 Kitano et al. ................. 118/326
6,106,375 A *  8/2000 Furusawa ........................ 451/67
6,333,003 B1* 12/2001 Katano et al. .................... 422/4
8,721,834 B2*  5/2014 Koo et al. ................. 156/345.11
2013/0240000 A1*  9/2013 Aizawa et al. ............ 134/104.4

FOREIGN PATENT DOCUMENTS

| CN | 101721842 A | 6/2010 |
| CN | 201565160 U | 9/2010 |
| JP | S60-140633 U | 9/1985 |
| JP | 62-109709 | 7/1987 |
| JP | 10-123336 | 5/1998 |
| JP | 11-320406 A | 11/1999 |
| JP | 2005-152892 A | 6/2005 |
| JP | 2007-216113 A | 8/2007 |
| JP | 2008-038712 | 2/2008 |
| JP | 2008-038714 | 2/2008 |

* cited by examiner

*Primary Examiner* — Eileen Morgan

(74) *Attorney, Agent, or Firm* — Baker & Hostetler LLP

(57) ABSTRACT

A gas-liquid separator includes: a gas-liquid separation tank; a gas-liquid introduction pipe configured to introduce a gas-liquid two-phase flow into the gas-liquid separation tank, the gas-liquid introduction pipe extending in the gas-liquid separation tank; a spray nozzle configured to spray pure water toward a liquid that has been collected on a bottom of the gas-liquid separation tank; a drain pipe communicating with a liquid discharge outlet provided in the bottom of the gas-liquid separation tank; and an exhaust pipe communicating with a gas discharge outlet provided in a side wall of the gas-liquid separation tank. The gas discharge outlet is located above a lower end of the gas-liquid introduction pipe.

6 Claims, 5 Drawing Sheets

GAS-LIQUID SEPARATOR AND POLISHING APPARATUS

CROSS REFERENCE TO RELATED APPLICATION

This document claims priority to Japanese Patent Application No. 2012-279750 filed Dec. 21, 2012, the entire contents of which are hereby incorporated by reference.

BACKGROUND OF THE INVENTION

Field of the Invention

The present invention relates to a gas-liquid separator for separating a gas-liquid two-phase flow, which is generated from an apparatus that uses a liquid, especially a liquid (foamable liquid) which is likely to generate bubbles, into a gas and a liquid and discharging them, and further relates to a polishing apparatus provided with such a gas-liquid separator.

Description of the Related Art

A polishing apparatus is known as a device for polishing a substrate surface while supplying a polishing liquid (slurry) onto a polishing surface. In the polishing apparatus, a gas-liquid two-phase flow is generated which is composed of a polishing liquid, containing a polishing agent and abrasive grains, and a gas, such as nitrogen gas, which is supplied during polishing or cleaning. Such a gas-liquid two-phase flow can also be generated when the gas, such as nitrogen gas, is mixed with the waste of a cleaning liquid after its use in cleaning of the polishing surface, or when a gas is mixed into the polishing liquid or the waste cleaning liquid.

In order to prevent such a gas-liquid two-phase flow from flowing into an exhaust line and causing clogging of the exhaust line with a liquid, a polishing apparatus is generally provided with a gas-liquid separator for separating a gas-liquid two-phase flow into a gas and a liquid and separately discharging them.

FIG. 1 is a vertical cross-sectional front view of an exemplary conventional gas-liquid separator. As shown in FIG. 1, the gas-liquid separator includes a cylindrical gas-liquid separation tank 100 with an open top and a closed bottom, and a gas-liquid introduction pipe 104 for introducing a gas-liquid two-phase flow, which has been generated e.g., on a polishing table (not shown) and recovered in a drain receiver 102, into the gas-liquid separation tank 100. A vertical connecting pipe 106 is coupled to a bottom of the drain receiver 102. The gas-liquid introduction pipe 104 is coupled to the lower end of the connecting pipe 106 and extends downward, and the lower end of the gas-liquid introduction pipe 104 reaches a lower portion of the gas-liquid separation tank 100. A liquid discharge outlet 100a, communicating with a drain pipe 108, is provided in the bottom of the gas-liquid separation tank 100. A gas discharge outlet 100b, communicating with an exhaust pipe 110, is provided in the side wall of the gas-liquid separation tank 100. This gas discharge outlet 100b is located above the lower end of the gas-liquid introduction pipe 104. The exhaust pipe 110 communicates with an exhaust damper (not shown).

A gas-liquid two-phase flow, recovered in the drain receiver 102, moves through the gas-liquid introduction pipe 104 and is introduced into the interior of the gas-liquid separation tank 100. A liquid, which has been separated from the gas-liquid two-phase flow and has accumulated on the bottom of the gas-liquid separation tank 100, is discharged through the liquid discharge outlet 100a and the drain pipe 108. A gas, which has been separated from the gas-liquid two-phase flow and has ascended to the upper portion of the gas-liquid separation tank 100, flows through the gas discharge outlet 100b into the exhaust pipe 110, and is discharged through the exhaust damper.

In order to prevent the gas-liquid two-phase flow in the gas-liquid introduction pipe 104 from flowing into the exhaust pipe 110, a tapered portion 104a is provided in the lower end surface of the gas-liquid introduction pipe 104 on the opposite side from the exhaust pipe 110 (the side not facing the exhaust pipe 110).

A waste liquid/waste gas treatment apparatus and method has been proposed which, in order to efficiently discharge a mist of polishing liquid generated during polishing, simultaneously takes a polishing liquid and a mist of polishing liquid into a drain receiver, and introduces the mixed fluid through a common discharge pipe into a gas-liquid separation means to separate the mixed fluid into a waste liquid and a waste gas and discharge them (see e.g., Japanese laid-open patent publication No. 10-123336). A gas-liquid separator has also been proposed which has a housing for storing a liquid discharged from a liquid discharge section of a gas-liquid separation tank, the housing being provided with a liquid discharge outlet and a gas discharge outlet (see e.g., Japanese laid-open patent publication No. 2008-38712 and Japanese laid-open patent publication No. 2008-38714). Further, a gas-liquid separator has been proposed which has a spiral plate installed in a tubular nozzle for introducing a gas-liquid mixture into a tank (see e.g., Japanese laid-open utility model publication No. 62-109709).

The gas-liquid separator shown in FIG. 1 has the advantage that its compact structure is suitable for its installation at a low position e.g., in a polishing apparatus. However, the gas-liquid two-phase flow flows freely downward in the gas-liquid introduction pipe 104 without any obstructions, and the downward flow hits the bottom of the gas-liquid separation tank 100 with high impact. Therefore, if a liquid to be treated contains a foamable material, considerable foaming of the liquid will occur during treatment of the gas-liquid two-phase flow, resulting in generation of a large amount of bubbles in the liquid that has accumulated on the bottom of the gas-liquid separation tank 100. When a large amount of bubbles is generated in the gas-liquid separation tank 100, it is possible that the bubbles (liquid) may reach the exhaust pipe 110, flow into the exhaust pipe 110, and leak through e.g., a flange provided on a bottom of the exhaust damper.

In particular, a polishing apparatus uses a polishing liquid containing a foamable additive such as a dispersant, i.e., a liquid (foamable liquid) which is likely to generate bubbles. Further, a large amount of treatment water and a gas, such as nitrogen gas, are used in spray cleaning of a substrate (i.e., an atomizer cleaning) after polishing. Therefore, a large amount of bubbles are likely to be generated in the gas-liquid separation tank 100.

SUMMARY OF THE INVENTION

The present invention has been made in view of the above situation. It is therefore an object to provide a gas-liquid separator which can effectively eliminate bubbles as generated in a liquid that has been collected in a gas-liquid separation tank, and to provide a polishing apparatus provided with such a gas-liquid separator.

A gas-liquid separator includes: a gas-liquid separation tank; a gas-liquid introduction pipe configured to introduce a gas-liquid two-phase flow into the gas-liquid separation tank, the gas-liquid introduction pipe extending in the gas-liquid separation tank; a spray nozzle configured to spray pure water toward a liquid that has been collected on a bottom of the gas-liquid separation tank; a drain pipe communicating with a liquid discharge outlet provided in the bottom of the gas-liquid separation tank; and an exhaust pipe communicating with a gas discharge outlet provided in a side wall of the gas-liquid separation tank, the gas discharge outlet being located above a lower end of the gas-liquid introduction pipe.

According to the gas-liquid separator described above, the gas-liquid two-phase flow containing a liquid (foamable liquid) which is likely to generate bubbles is separated into a gas and a liquid in the gas-liquid separation tank. Even if bubbles are generated from the liquid that has accumulated on the bottom of the gas-liquid separation tank, the bubbles can be eliminated by the pure water sprayed from the spray nozzle.

In a preferred embodiment, the spray nozzle comprises a plurality of conical nozzles.

According to this embodiment, the pure water can be sprayed more uniformly onto the entire liquid that has been collected on the bottom of the gas-liquid separation tank.

In a preferred embodiment, the gas-liquid separator further includes an exhaust box having, in its interior, a mist trap configured to capture a mist contained in a gas, the exhaust pipe communicating with the exhaust box.

Even if a gas flowing in the exhaust pipe contains a mist, the mist can be captured by the mist trap in the exhaust box.

In a preferred embodiment, the mist trap includes a trap plate disposed such that a gas flow hits the trap plate, and a weir plate configured to dam up a liquid that has been captured by the trap plate and dropped from the trap plate onto a bottom of the exhaust box.

A polishing apparatus includes: a polishing table having a polishing surface; a top ring configured to hold a substrate and press the substrate against the polishing surface; a processing liquid supply nozzle configured to supply a processing liquid to the polishing surface; a drain receiver disposed around the polishing table and configured to recover a gas-liquid two-phase flow that has been removed from the polishing table; and the gas-liquid separator configured to separate the gas-liquid two-phase flow, which has been recovered by the drain receiver, into a gas and a liquid and discharging the gas and the liquid.

According to the gas-liquid separator of the present invention, a gas-liquid two-phase flow can be effectively separated into a gas and a liquid with the relatively compact construction. In particular, a gas-liquid two-phase flow containing a liquid which is likely to generate bubbles (foamable liquid) can be separated into a gas and a liquid in the gas-liquid separation tank. Even if bubbles are generated from the liquid that has been collected on the bottom of the gas-liquid separation tank, the bubbles can be eliminated by the pure water sprayed from the spray nozzle. This can avoid leakage of the liquid through a flange provided at a bottom of an exhaust damper.

DETAILED DESCRIPTION

Embodiments of the present invention will now be described with reference to the drawings.

Figure 1:
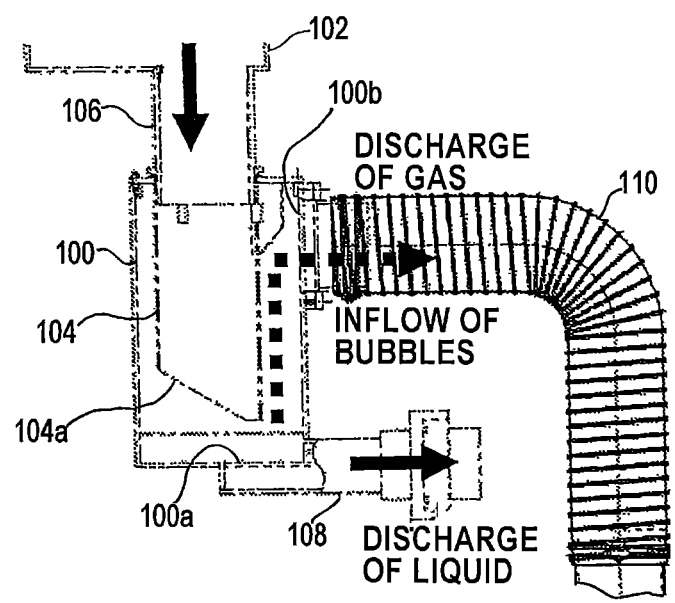
FIG. 1 is a vertical cross-sectional front view of an exemplary conventional gas-liquid separator.
Figure 2:
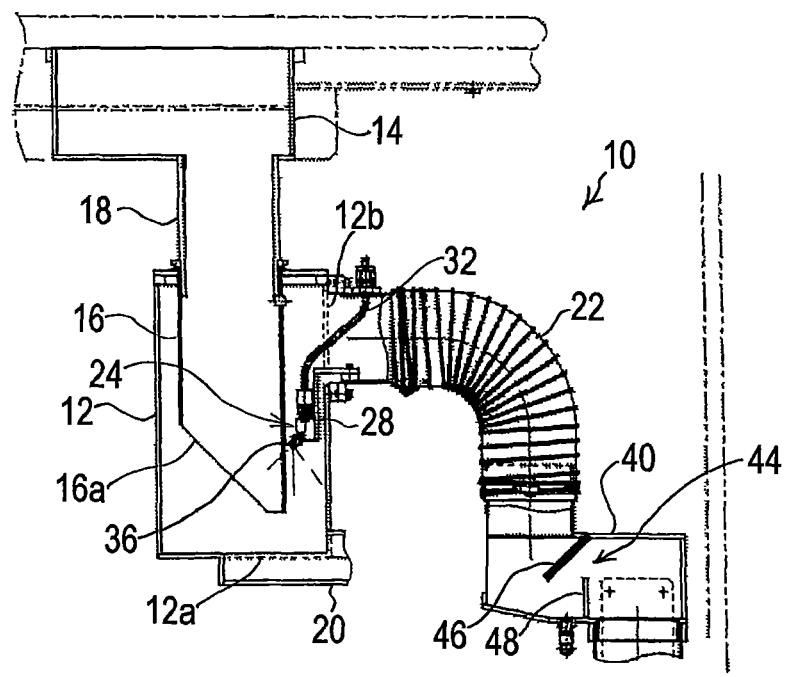
FIG. 2 is a vertical cross-sectional front view of a gas-liquid separator according to an embodiment of the present invention.

FIG. 2 is a vertical cross-sectional front view of a gas-liquid separator according to an embodiment of the present invention. As shown in FIG. 2, a gas-liquid separator 10 includes a cylindrical gas-liquid separation tank 12 with an open top and a closed bottom, and a gas-liquid introduction pipe 16 for introducing a gas-liquid two-phase flow, which has been generated e.g., on a polishing table 50 (see FIG. 5) and recovered in a drain receiver 14, into the gas-liquid separation tank 12. A vertical connecting pipe 18 is coupled to a bottom of the drain receiver 14. The gas-liquid introduction pipe 16 is coupled to a lower end of the connecting pipe 18 and extends downward, and a lower end of the gas-liquid introduction pipe 16 reaches a lower portion of the gas-liquid separation tank 12. A liquid discharge outlet 12a, communicating with a drain pipe 20, is provided in the bottom of the gas-liquid separation tank 12. A gas discharge outlet 12b, communicating with an exhaust pipe 22, is provided in a side wall of the gas-liquid separation tank 12. The gas discharge outlet 12b is located above the lower end of the gas-liquid introduction pipe 16.

In order to prevent a gas-liquid two-phase flow in the gas-liquid introduction pipe 16 from flowing into the exhaust pipe 22, a tapered portion 16a is provided in the lower end surface of the gas-liquid introduction pipe 16. This tapered portion 16a is a tapered cutout portion formed at the bottom of the gas-liquid introduction pipe 16 on the opposite side from the exhaust pipe 22 (the side not facing the exhaust pipe 22).

A nozzle unit 24 is disposed in the interior of the gas-liquid separation tank 12 at a position between an exhaust-pipe-side inner surface of the gas-liquid separation tank 12 and an outer circumferential surface of the gas-liquid introduction pipe 16. The nozzle unit 24 is secured via a support block 26 to a bracket 28 which is secured to the inner circumferential surface of the exhaust pipe 22. The support block 26 is connected via a connector 30 (see FIG. 4) to a pure water supply pipe 32, which extends from the gas-liquid separation tank 12 into the exhaust pipe 22 and is coupled to a not-shown pure water supply line extending outside the exhaust pipe 22.

Figure 3:
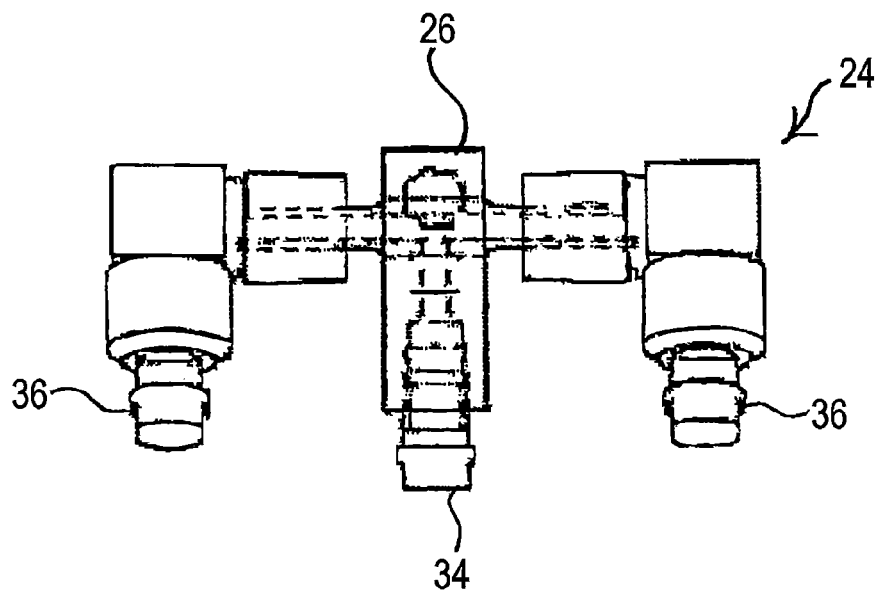
FIG. 3 is a front view of a nozzle unit provided in the gas-liquid separator shown in FIG. 2.
Figure 4:
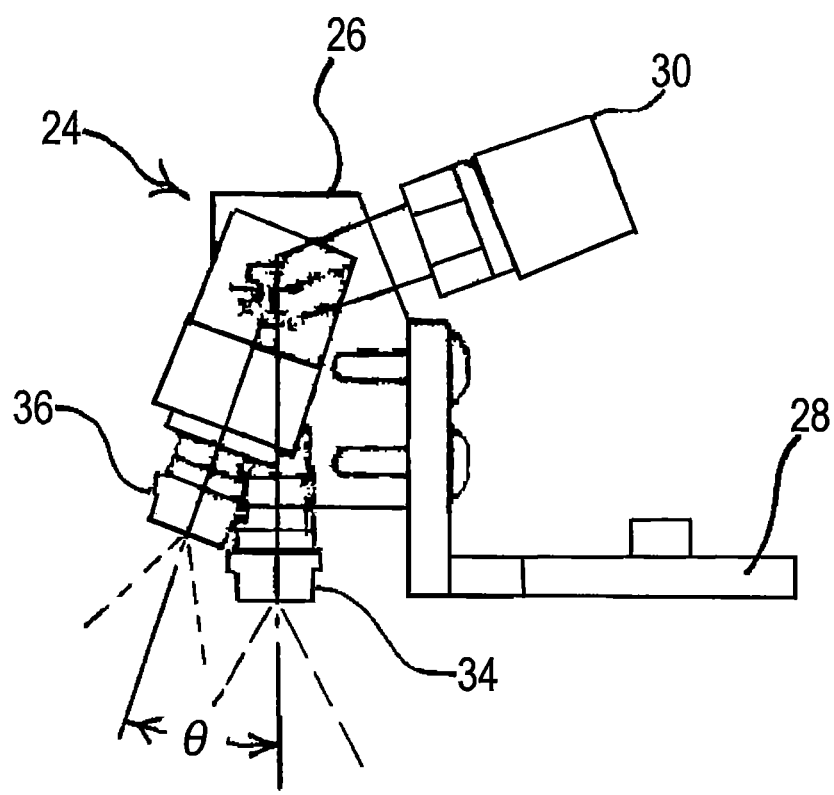
FIG. 4 is a right side view of the nozzle unit shown in FIG. 3.

As shown in detail in FIGS. 3 and 4, the support block 26 of the nozzle unit 24 supports a central spray nozzle 34 located centrally, and a pair of side spray nozzles 36 located at both sides of the central spray nozzle 34. Pure water flow passages for supplying pure water, supplied from the pure water supply pipe 32, to the spray nozzles 34, 36 are formed in the support block 26.

The central spray nozzle 34 is comprised of a conical nozzle configured to spray pure water in a conical shape, e.g., with a cone angle of 60°, and disposed in a vertical position so that its ejection orifice faces downward in a vertical direction. Each side spray nozzle 36 is likewise comprised of a conical nozzle configured to spray pure water in a conical shape, e.g., with a cone angle of 60°, and is disposed in an inclined position so that its ejection orifice faces in a direction inclined at an angle θ with respect to the vertical direction. This inclination angle θ is, for example, 20°(θ=20°).

Pure water from the pure water supply pipe 32 is passed through the pure water flow passages in the support block 26 and supplied to the spray nozzles 34, 36. The pure water supplied to the spray nozzles 34, 36 is sprayed from the ejection orifices of the spray nozzles 34, 36 toward a liquid that has been collected on the bottom of the gas-liquid separation tank 12. By using conical nozzles as the spray nozzles 34, 36 so that the pure water will be sprayed over a wider range, the pure water can be sprayed more uniformly onto the entire liquid that has been collected on the bottom of the gas-liquid separation tank 12.

When a gas-liquid two-phase flow containing a liquid (foamable liquid), which is likely to generate bubbles, is separated into a gas and a liquid in the gas-liquid separation tank 12, bubbles are likely to be generated from the liquid that has been collected on the bottom of the gas-liquid separation tank 12. Even if the bubbles are generated, such bubbles can be eliminated by the pure water that is sprayed from the spray nozzles 34, 36 toward the liquid collected on the bottom of the gas-liquid separation tank 12.

The exhaust pipe 22 is coupled to an exhaust box 40 for orthogonally changing a flow direction of a gas from a vertical direction to a horizontal direction. An exhaust damper (not shown) is installed downstream of the exhaust box 40. A gas flowing in the exhaust pipe 22 flows into the exhaust box 40, where the gas orthogonally changes its flow direction from the vertical direction to the horizontal direction, and then the gas flows toward the exhaust damper.

A mist trap 44 for capturing a mist contained in the gas flowing in the exhaust pipe 22 is provided at an inlet of the exhaust box 40. This mist trap 44 includes a trap plate 46 disposed such that the gas flowing into the exhaust box 40 hits the plate 46, and a weir plate 48 for damming up a liquid that has been collected in the exhaust box 40. The trap plate 46 has an upper end secured to a ceiling of the exhaust box 40, and extends downward. The weir plate 48 has a lower end secured to a bottom plate of the exhaust box 40, and extends upward. The trap plate 46 is, for example, a steel plate or a mesh plate.

The gas that has flowed into the exhaust box 40 impinges on the trap plate 46, while orthogonally changing its flow direction from the vertical direction to the horizontal direction, and as a result a mist contained in the gas is captured by the trap plate 46 and drops as a liquid. The liquid that has dropped from the trap plate 46 is dammed by the weir plate 48. Thus, the liquid accumulates on the upstream side of the weir plate 48 provided on the bottom of the exhaust box 40.

In this manner, the gas flows through the exhaust pipe 22 into the exhaust box 40, a mist is removed from the gas by the mist trap 44 provided in the exhaust box 40, and then the gas flows down toward the exhaust damper. Therefore, the gas, discharged from the exhaust damper, can be made free of mist.

In operation of the gas-liquid separator 10, a gas-liquid two-phase flow, recovered in the drain receiver 14, flows through the connecting pipe 18 and the gas-liquid introduction pipe 16, and is introduced into the interior of the gas-liquid separation tank 12. A liquid is separated from the gas-liquid two-phase flow and is collected on the bottom of the gas-liquid separation tank 12. This liquid is discharged through the liquid discharge outlet 12a and the drain pipe 20. A gas is separated from the gas-liquid two-phase flow and ascends to the upper portion of the gas-liquid separation tank 12. This gas is introduced through the gas discharge outlet 12b into the exhaust pipe 22.

If bubbles are generated in the liquid that has been collected on the bottom of the gas-liquid separation tank 12, the bubbles can be eliminated by the pure water that is sprayed from the ejection orifices of the spray nozzles 34, 36 toward the liquid that has been collected on the bottom of the gas-liquid separation tank 12. The gas flows through the exhaust pipe 22 into the exhaust box 40, where a mist is removed from the gas by the mist trap 44 installed in the exhaust box 40. Accordingly, a mist-free gas is discharged from the exhaust damper.

Figure 5:
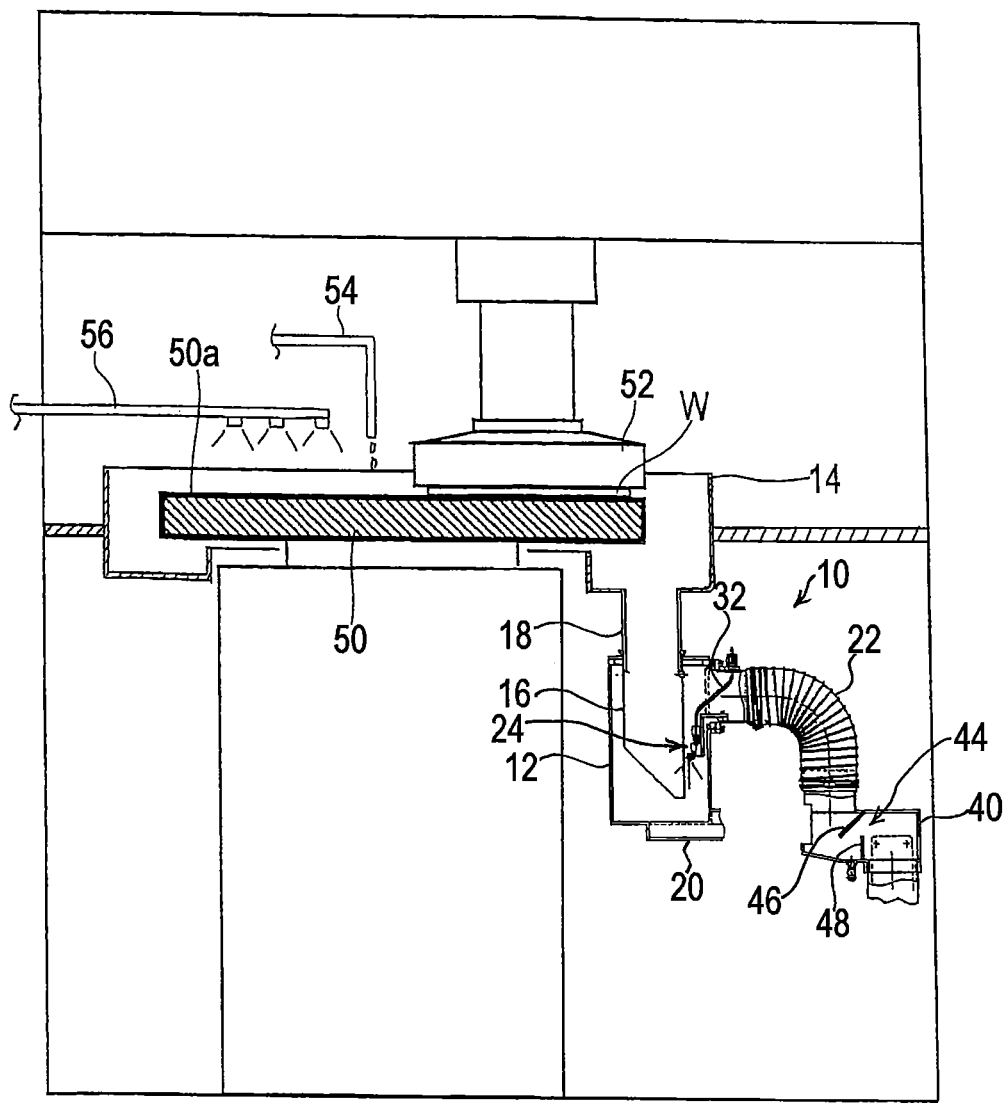
FIG. 5 is a schematic view of a polishing apparatus provided with the gas-liquid separator shown in FIG. 2.

FIG. 5 schematically shows a polishing apparatus provided with the gas-liquid separator 10 shown in FIG. 2. The polishing apparatus includes a rotatable polishing table 50 having a polishing surface 50a, a rotatable top ring 52 for holding a substrate W, such as a semiconductor wafer, and, pressing it against the polishing surface 50a of the polishing table 50, a processing liquid supply nozzle 54 for supplying a processing liquid, such as a polishing liquid and a dressing liquid (e.g., water), to the polishing surface 50a of the polishing table 50, a dresser (not shown) for dressing the polishing surface 50a of the polishing table 50, and an atomizer 56 for spraying an atomized fluid mixture of a liquid (e.g., pure water) and a gas (e.g., nitrogen gas) through one or more nozzles onto the polishing surface 50a of the polishing table 50.

The annular drain receiver 14 for recovering a gas-liquid two-phase flow generated on the polishing table 50 is secured to the polishing apparatus so as to surround the periphery of the polishing table 50. The connecting pipe 18 of the gas-liquid separator 10 is mounted to the bottom of the drain receiver 14.

In operation of the polishing apparatus, polishing of a substrate W is carried out by pressing the substrate W, held and being rotated by the top ring 52, against the polishing surface 50a of the rotating polishing table 50 while supplying the polishing liquid from the processing liquid supply nozzle 54 onto the polishing surface 50a. A gas-liquid two-phase flow, constituted by the polishing liquid and air that has been mixed into the polishing liquid, is generated during the polishing of the substrate W. This gas-liquid two-phase flow is discharged from the polishing table 50 and recovered by the drain receiver 14. The gas-liquid two-phase flow, recovered by the drain receiver 14, flows into the gas-liquid separator 10, where the gas-liquid two-phase flow is separated into a gas and a liquid. The liquid is discharged through the drain pipe 20 to the exterior, while the gas is discharged through the exhaust pipe 22 and the exhaust damper to the exterior.

If the polishing liquid contains a foamable additive, such as a dispersant, bubbles will be generated in the liquid that has been separated from the gas-liquid two-phase flow and has been collected on the bottom of the gas-liquid separation tank 12. The bubbles are eliminated by the pure water sprayed from the spray nozzles 34, 36. Even if a mist is contained in the gas that has been separated from the gas-liquid two-phase flow and has flowed into the exhaust pipe 22, the mist is removed by the mist trap 44 in the exhaust box 40.

In order to remove polishing debris, polishing particles, etc. that have accumulated on the polishing surface 50a of the polishing table 50, cleaning of the polishing surface 50a is performed by spraying an atomized fluid mixture of a liquid (e.g., pure water) and a gas (e.g., nitrogen gas) onto the polishing surface 50a from the one or more nozzles of the atomizer 56. Therefore, the gas-liquid two-phase flow of a liquid (e.g., pure water) and a gas (e.g., nitrogen gas) is also generated during the cleaning operation with the atomizer. The gas-liquid two-phase flow, sprayed from the atomizer 56, is discharged from the polishing table 50 and recovered by the drain receiver 14. The gas-liquid two-phase flow, recovered by the drain receiver 14, flows into the gas-liquid separator 10, where the gas-liquid two-phase flow is separated into a gas and a liquid. The liquid is discharged through the drain pipe 20 to the exterior, while the gas is discharged through the exhaust pipe 22 to the exterior.

The bubbles which are generated in the liquid collected on the bottom of the gas-liquid separation tank 12 are eliminated by the pure water sprayed from the spray nozzles 34, 36. A mist which is contained in the gas that has flowed into the exhaust pipe 22 is removed by the mist trap 44 in the exhaust box 40.

While the present invention has been described with reference to embodiments, it is understood that the present invention is not limited to the embodiments described above, but is capable of various changes and modifications within the scope of the inventive concept as expressed herein.

What is claimed is:

1. A polishing apparatus comprising:
   a polishing table having a polishing surface;
   a top ring configured to hold a substrate and press the substrate against the polishing surface;
   a processing liquid supply nozzle configured to supply a processing liquid to the polishing surface;
   a drain receiver disposed around the polishing table and configured to recover a gas-liquid two-phase flow that has been removed from the polishing table, the gas-liquid two-phase flow containing the processing liquid; and
   a gas-liquid separator configured to separate the gas-liquid two-phase flow, which has been recovered by the drain receiver, into a gas and a liquid and discharging the gas and the liquid,
   the gas-liquid separator including:
      a gas-liquid separation tank;
      a gas-liquid introduction pipe configured to introduce a the gas-liquid two-phase flow into the gas-liquid separation tank, the gas-liquid introduction pipe extending in the gas-liquid separation tank;
      a spray nozzle configured to spray pure water onto the liquid that has been separated from the gas-liquid two-phase flow and has been collected on a bottom of the gas-liquid separation tank, the collected liquid containing the processing liquid, the spray nozzle comprises an orifice directed vertically and downwardly toward the bottom of the liquid separation tank, wherein the spray nozzle comprises a first nozzle having the orifice directed vertically and downwardly and a second nozzle, the second nozzle having an orifice directed at an angle relative to the first nozzle;
      a drain pipe communicating with a liquid discharge outlet provided in the bottom of the gas-liquid separation tank; and
      an exhaust pipe communicating with a gas discharge outlet provided in a side wall of the gas-liquid separation tank, the gas discharge outlet being located above a lower end of the gas-liquid introduction pipe.

2. The polishing apparatus according to claim 1, wherein the first nozzle is oriented in a vertical direction, and the second nozzle is inclined from the vertical direction at a predetermined angle.

3. The polishing apparatus according to claim 1, wherein the spray nozzle comprises a plurality of conical nozzles.

4. The polishing apparatus according to claim 1, further comprising an exhaust box having, in its interior, a mist trap configured to capture a mist contained in a gas, the exhaust pipe communicating with the exhaust box.

5. The polishing apparatus according to claim 4, wherein the mist trap includes a trap plate disposed such that a gas flow hits the trap plate, and a weir plate configured to dam up a liquid that has been captured by the trap plate and dropped from the trap plate onto a bottom of the exhaust box.

6. The polishing apparatus according to claim 1, wherein the spray nozzle comprises a conical nozzle.

* * * * *